US007832001B2

(12) United States Patent  (10) Patent No.: US 7,832,001 B2
Noble  (45) Date of Patent: Nov. 9, 2010

(54) IDENTIFICATION SYSTEM AND METHOD

(75) Inventor: Gary Paul Noble, Near Broadway (GB)

(73) Assignee: International Business Machines Corporation, Armonk, NY (US)

( * ) Notice: Subject to any disclaimer, the term of this patent is extended or adjusted under 35 U.S.C. 154(b) by 1432 days.

(21) Appl. No.: 10/549,499

(22) PCT Filed: Jun. 21, 2004

(86) PCT No.: PCT/EP2004/051176

§ 371 (c)(1),
(2), (4) Date: Sep. 14, 2005

(87) PCT Pub. No.: WO2005/001671

PCT Pub. Date: Jan. 6, 2005

(65) Prior Publication Data

US 2006/0174130 A1    Aug. 3, 2006

(30) Foreign Application Priority Data

Jun. 28, 2003    (GB) .................................. 0315156.0

(51) Int. Cl.
    *G06F 21/00*    (2006.01)
(52) U.S. Cl. ........................... 726/9; 726/20; 340/5.67
(58) Field of Classification Search .............. 713/182,
    713/185, 155; 705/18, 38, 42, 70, 235; 455/558,
    455/411; 707/7; 726/9, 20; 380/275; 235/375–380;
    340/5.67
    See application file for complete search history.

(56) References Cited

U.S. PATENT DOCUMENTS

| 5,629,981 | A  | * | 5/1997 | Nerlikar ..................... 713/168 |
| 6,173,209 | B1 | * | 1/2001 | Laval et al. ................... 700/91 |
| 6,400,272 | B1 | * | 6/2002 | Holtzman et al. ......... 340/572.1 |
| 6,446,208 | B1 | * | 9/2002 | Gujar et al. ................. 713/185 |
| 6,448,886 | B2 | * | 9/2002 | Garber et al. .............. 340/10.1 |
| 6,581,161 | B1 | * | 6/2003 | Byford ....................... 713/182 |

(Continued)

FOREIGN PATENT DOCUMENTS

WO    WO 02/31629    4/2002

OTHER PUBLICATIONS

Microsoft Corporation, Microsoft Computer Dictionary, May 1, 2002, Microsoft Press, Fifth Edition. p. 158.*

*Primary Examiner*—Gilberto Barron, Jr.
*Assistant Examiner*—Virginia Ho
(74) *Attorney, Agent, or Firm*—Schmeiser, Olsen & Watts; William H. Steinberg (57) ABSTRACT

An identification method and system. A user is scanned by a Radio Frequency Identification (RFID) reader to read N RFID tags respectively embedded in N objects carried by the user. Each tag of the N tags includes a tag identifier. N may be at least 1 or at least 2. The N tags read by the RFID reader are compared with M tags in a registered record of data. The registered record comprises a reference to the user. Each tag of the M tags includes a tag identifier. M is at least N. The user is permitted access to a resource if the comparing has determined that the tag identifiers in the M tags include the tag identifiers in the N tags read by the RFID reader. The resource may be a computer resource. Alternatively, the resource may be a resource other than a computer resource.

20 Claims, 4 Drawing Sheets

U.S. PATENT DOCUMENTS

| | | | |
|---|---|---|---|
| 6,845,453 B2 * | 1/2005 | Scheidt et al. | 726/5 |
| 7,005,985 B1 * | 2/2006 | Steeves | 340/572.1 |
| 2001/0021950 A1 | 9/2001 | Hawley et al. | |
| 2002/0184509 A1 * | 12/2002 | Scheidt et al. | 713/185 |
| 2003/0046083 A1 * | 3/2003 | Devinney et al. | 704/273 |
| 2003/0052539 A1 * | 3/2003 | Ott | 307/10.2 |
| 2003/0084282 A1 | 5/2003 | Taruguchi | |
| 2003/0126017 A1 * | 7/2003 | Rau et al. | 705/16 |
| 2003/0154406 A1 * | 8/2003 | Honarvar et al. | 713/201 |
| 2003/0158785 A1 * | 8/2003 | Erca | 705/26 |
| 2003/0163446 A1 * | 8/2003 | Frieden et al. | 707/1 |
| 2003/0187787 A1 * | 10/2003 | Freund | 705/39 |

* cited by examiner

IDENTIFICATION SYSTEM AND METHOD

TECHNICAL FIELD

This invention relates to the field of identity authentication and security. In particular, the invention relates to identification of individuals for controlling access to resources.

BACKGROUND ART

Security is an expanding field in which requirements for authentication of the identity of individuals is becoming increasingly important in many different situations. Identity authentication encompasses many different levels from simple ticket requirements for access to a charged entry environment to security requirements for access to restricted confidential areas.

Access to many different resources is required to be controlled. The resources may take many different forms including, but not restricted to the following. Physical resources such as locations (e.g. hotel rooms, secure areas, etc.), physical objects (e.g. safes, computers, etc.), and data resources (e.g. secure web sites, financial data, etc.).

Existing security arrangements include physical objects such as keys, Smartcards, etc. which can be passed between single individuals. Physical objects have the disadvantage that they can be mislaid or stolen. Secure physical mechanisms such as keys and locks (particularly using Smartcards) have a high cost of installation and upkeep.

There are also security arrangements in which a pass-code is memorised and used by an individual. Again, it is possible to pass this form of security means between individuals and, furthermore, it can be passed to more than one individual at a time. Pass-codes can be inadvertently disclosed to an untrustworthy party. Also, if specific credentials such as pass-codes remain fixed for long periods of time, there is an increasing risk of exposure.

Another form of security for individuals is referred to as biometrics, which is the biological identification of a person which includes the characteristics of structure or action. For example, iris or retinal patterns, hand geometry, fingerprints, voice responses to challenges, the dynamics of hand-written signatures, etc. are all forms of biometrics. Biometrics is a strong form of identity authentication of an individual; however, many forms have a high failure rate. Also, biometric identifications have the disadvantage that they are impossible to withdraw.

DISCLOSURE OF INVENTION

The aim of the present invention is to provide an improved identification system. The proposed system uses simple ergonomics and is easy to use. There is also a potential for mass standards to be applied using the proposed system.

The present invention provides an identification system in which the identifying means changes over time at any required interval making the system hard to predict and strengthening the system against impostors.

The proposed identification system may provide moveable credentials that enable the physical proximity of an individual to a physical location to result in security actions.

According to a first aspect of the present invention there is provided an identification system for controlling access to a resource, the system including: one or more objects each hosting an electronic tag; a reading means; and a data system; the electronic tag having stored identification data readable by the reading means for processing by the data system, and the identification system having registration means for registering a set of identification data for one or more electronic tags, wherein a user is permitted access to the resource when the user has in his possession at least one of the objects hosting an electronic tag with registered identification data.

The resource may be one of the group of a place, an object, data, information, payment means, or authority to act.

Preferably, the electronic tags are radio frequency identification tags.

In one embodiment, the user may be permitted access to the resource when all the electronic tags in the registered set are present. In an alternative embodiment, the user may be permitted access to the resource when a sub-set of the electronic tags in the registered set are present.

A reading means may be provided at a point of access to the resource and the reading means may automatically identify the tag identification data and seek authorisation from the data system.

The registration means may include authentication means for authentication of the user. The authentication means may use public key infrastructure. For example, by a user signing the registered set with a private key and providing a public key to a party seeking authentication.

The step of registering a set of identification data may include providing a reference to the set. The reference is the tag identification data of one of the registered set of identification data selected according to predefined selection criteria. The predefined selection criteria may include the type of object in which the tag is hosted and a count of the sorted identification data.

The registered set of identification data may have a reference. The reference may be the tag identification data of one of the registered set of identification data selected according to predefined selection criteria. The predefined selection criteria may include the type of object in which the tag is hosted and a count of the sorted identification data.

The registration means may generate a record of the set of registered identification data, the record including a reference to the user, and one or more attributes of the user. The user may be identified by reading the identification data of the tags in his possession and referring to the record in the data system.

The data system is preferably accessible via a network.

There may be provided an interface for the registration means for confirming the registered set of identification data. The registration means may have a default for accepting or rejecting identification data of tags hosted in predefined types of objects.

Preferably, the objects are objects habitually carried on a person including clothing, personal effects, and consumables.

The registered set may have an expiry time or may be superseded when another set is registered.

According to a second aspect of the present invention there is provided an identification method comprising: registering a set of identification data for one or more electronic tags (i.e., M electronic tags), each tag being hosted in an object of M objects; a user carrying one or more of the M objects (i.e., carrying N objects such that N is at least 1 and N is less than or equal to M); scanning a user to read the identification data of the N electronic tags hosted in the N objects being carried by the user; comparing the scanned identification data with the registered identification data; and permitting access by the user to a resource if the scanned identification data is a sub-set of the registered identification data (i.e., if the identification data of the M registered electronic tags comprise the identification data of the N electronic tags in the N objects being carried by the user).

The resource may be one of the group of a place, an object, data, information, payment means, or authority to act.

Preferably, the electronic tags are radio frequency identification tags.

In one embodiment, the user is permitted access to the resource when all the electronic tags in the registered set are present. In an alternative embodiment, the user may be permitted access to the resource when any sub-set of the electronic tags in the registered set are present.

The step of registering may include authentication of a user. The authentication may use public key infrastructure.

The registration may generate a record of the set of registered identification data including a reference to the user, and one or more attributes of the user. The user may be identified by scanning the identification data of the tags in his possession and referring to the record.

The registered set of identification data is preferably accessible via a network.

The step of registering may include the user conforming the registered set of identification data. In addition, the step of registering may include defaulting to accept or reject identification data of tags hosted in predefined types of objects.

The objects are preferably objects habitually carried on a person including clothing, personal effects, and consumables.

The step of registering may be repeated at time intervals.

According to a third aspect of the present invention there is provided an identification system for controlling access to a resource, the system including: an object hosting an electronic tag; a reading means; and a data system; the electronic tag having stored identification data readable by the reading means for processing by the data system, and wherein a user is permitted access to the resource when the user has in his possession the object hosting the electronic tag.

According to a fourth aspect of the present invention there is provided an identification service comprising: registering a set of identification data (212, 312) for one or more electronic tags (102, 204, 306), each tag being hosted in an object (100, 202, 310); a user (200, 300) carrying one or more of the objects (100, 202, 310); scanning a user (200, 300) to read the identification data (104) of the electronic tags (102, 204. 306) hosted in the objects (100. 202, 310) being carried by the user (200, 300); comparing the scanned identification data (104) with the registered identification data (212, 312); and permitting access by the user (200, 300) to a resource if the scanned identification data is a sub-set of the registered identification data (212, 312).

BRIEF DESCRIPTION OF THE DRAWINGS

Embodiments of the present invention will now be described, by way of examples only, with reference to the accompanying drawings in which.

MODE FOR THE INVENTION

An identification system is provided in which objects are tagged with electronic tags. One or more tags can be inserted into any form of object at the time of manufacture and may remain in the object until the object is destroyed. It may also be possible to destroy or deactivate the tag before the object hosting it is destroyed. Similarly a tag may be added to an object at any time during the lifetime of the object.

Radio frequency identification (RFID) technology exists in which tags are provided in the form of transponders that are embedded in items to act as identifiers of the items. Readers or scanners act as an interface between the transponders and a data environment. Transponders and the means used to read them are available in a number of forms. Any suitable form can be used for the purposes of the present invention.

Further information and detail of different forms of RFID systems can be found in the following references: http://www.idtechex.com; http://tagsys.net; and http://rftagsltd.com.

Figure 1A:
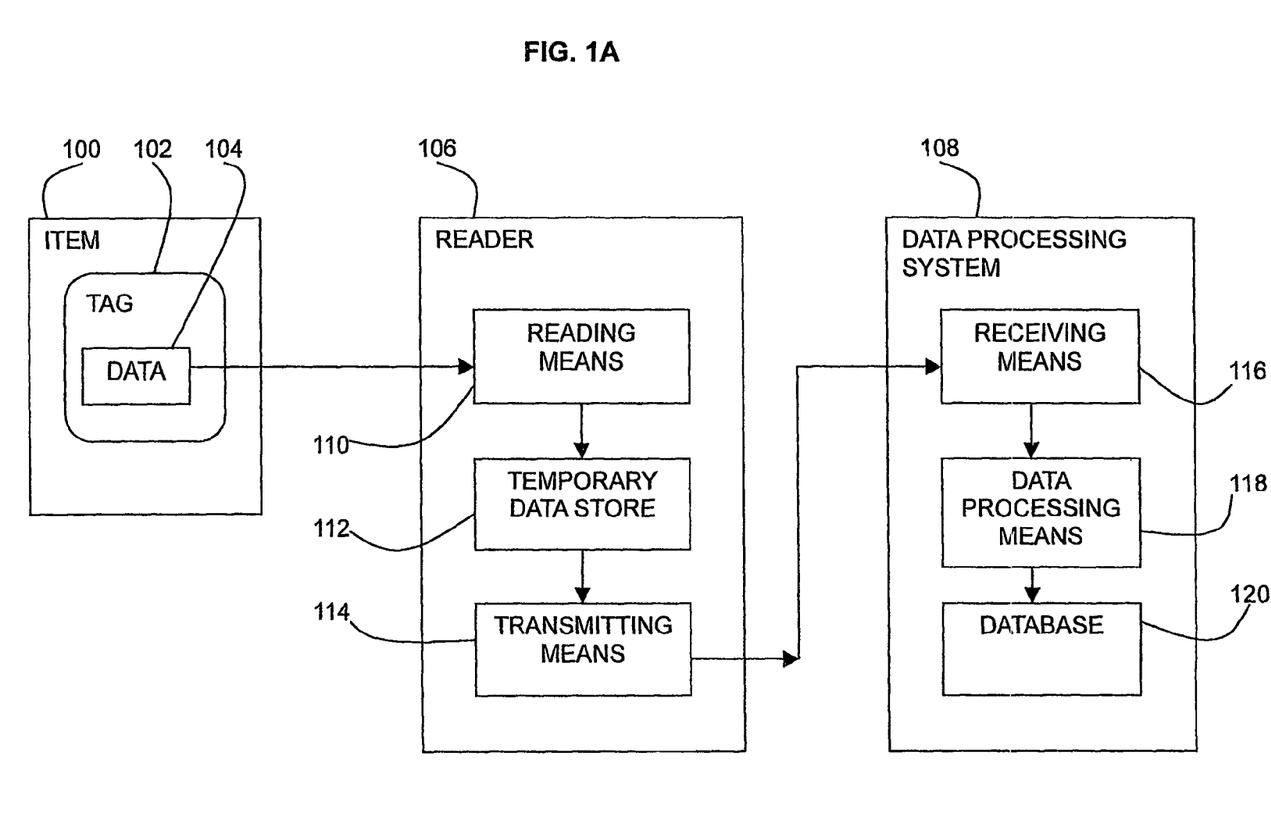
FIGS. 1A and 1B are block diagrams of a tag system used in an identification system in accordance with the present invention.

Referring to FIG. 1A, an item 100 has a tag 102 embedded in it. The tag 102 is embedded in a way that it is securely but unobtrusively attached to the item 100. The form of attachment will depend on the nature of the item 100. The tag 102 is in the form of a transponder including a microchip with a memory capacity for holding data 104. The form of the transponder may vary according to the system being used. For example, transponders may differ in size, memory capacity, physical construction and distance over which they can be operated. As an example only, a transponder may have a memory capacity of 64 bits and a reading range in the order of 1 to 2 meters.

A transponder may be a passive type which is energised by an external source provided by the reader 106. Alternatively, a transponder may be an active type with built-in energy means, for example, a battery.

A reader 106 is provided in any location in which tags 102 will be read to obtain the data 104 held in the tags 102. The reader includes a reading means 110 which scans and reads the data 104 held in the microchip of the tags 102. The reader 106 has temporary storage means 112 for storing the read data 104 and transmitting means 114 for transmitting the read data 104 to a data processing system 108.

The data processing system 108 has a receiving means 116 for receiving the read data 104 from the transmitting means 114 of the reader 106. The data processing system 108 also has data processing means 118 and a database 120 for storing the data 104 obtained from the tags 102. The data processing system 108 can be provided in the form of a computer with network communication in which access is available to the information held in the database via the network. For example, the network may be the Internet allowing public access to a public part of the database via a web site.

Figure 1B:
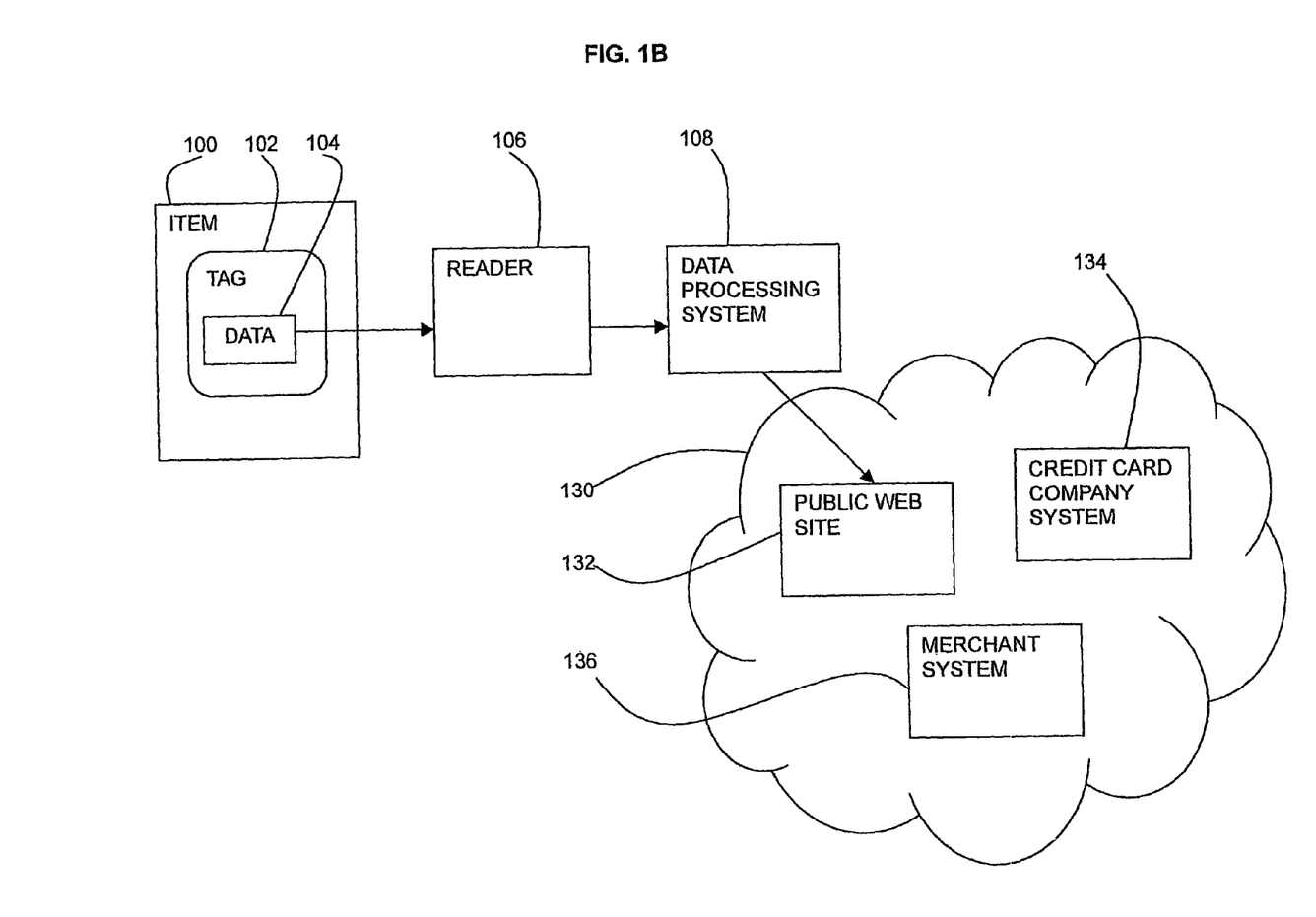

FIG. 1B shows the communication of the data processing system 108 with a network environment 130. The network environment 130 includes a public web site 132 of the data processing system 108 which can be accessed by users of the identification system. The public web site 132 can include published identification data 104 as described further below. The network environment 130 can also connect, for example, a credit card company's system 134 and a merchant's system 136.

The identification system operates by an individual carrying on his person one or more objects hosting one or more tags. As an example, the items can be everyday items such as articles of clothing, personal effects such as watches, mobile phones, keys, etc. which can all host tags. In this way, instead of the data held within the tag being used to identify the object the tag is embedded in, the data is used to identify the individual carrying the object and to authorise the individual to access a resource.

A user may be any entity such as an individual, a group of individuals, a company etc. A user is registered at a point in time with a set of tags. Registration is carried out by scanning the tags to obtain the identification data for each of the tags. The identification data for each of the tags in the set is stored with a reference for the user.

Figure 2:
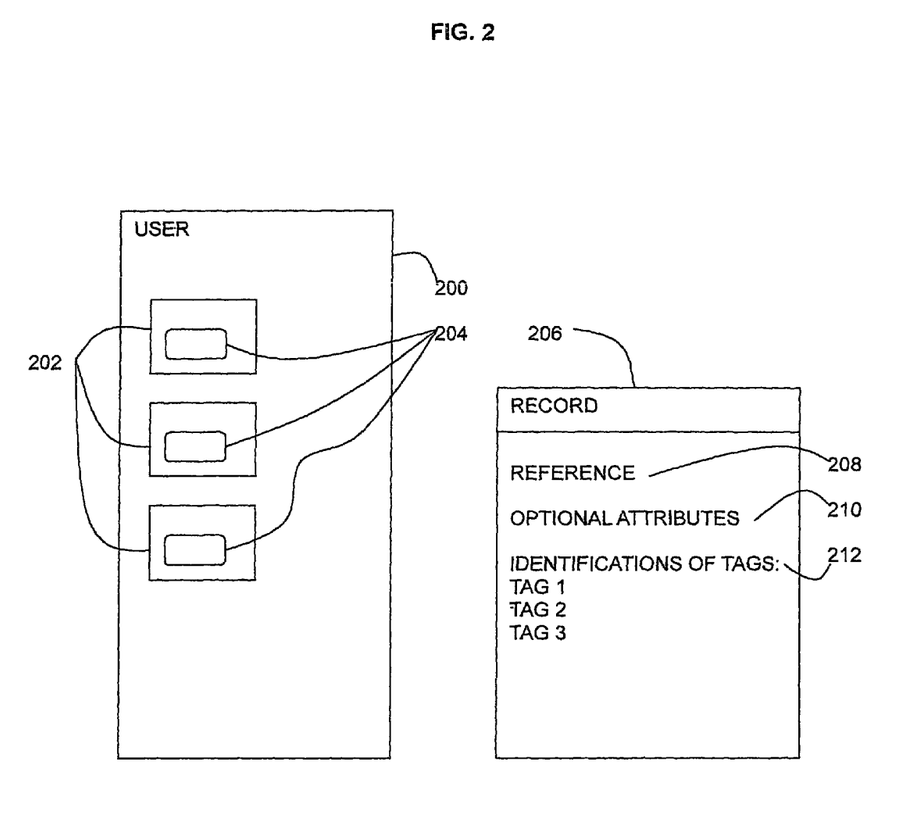
FIG. 2 is a schematic diagram of an identification system in accordance with a first embodiment of the present invention.

Referring to FIG. 2, a user 200 has a plurality of tags 204 (i.e., N tags such that N is at least 2) embedded in N different items 202. At registration, a record 206 is generated which contains a reference 208, optional attributes relating to the user 200, and the identification data 212 for each of the tags 204 to be associated with the user 200.

The reference 208 for the user 200 may be the name of the user or, depending on the level of security required, any reference to the user. If the system is used for security, for example to control access to confidential resources, the system may authenticate a user by additional authentication means. Personal details can be recorded as attributes 210 in the record 206. The attributes 210 can include biometric information of the user 200.

The system can require that the user 200 be in possession of the total set of M registered tags for access to a resource to be permitted. Alternatively, a sub-set of the registered set of tags (i.e., a sub-set comprising N tags of the registered N tags such that N is equal to or less than M) can be sufficient for access to be permitted. The sub-set comprising N tags could be any permutation of the total set of the M registered tags, or alternatively could be a minimum number of tags of the M registered tags may be required.

The user 200 can use a sub-set of the set of recorded tags 204 for a specific security requirement. The sub-set used can change over time and can be random or chosen by the user 200. A user 200 can create short or long term credentials from hours to days by effectively being scanned for tags present and using a sub-set of the tags as a signature.

The change in the sub-set of tags being carried by a user could change at intervals. This churn of tag sub-sets makes the identification system hard to predict and prevents tags being covertly acquired by another party. Also, as the tags are embedded in objects that may be worn or carried by the user, the unauthorised acquisition of tags by a third party is made very difficult. As the tags are low cost items, they may be embedded in a wide range of items which enables the churn of sub-sets and makes the prediction of the sub-set at a particular time impossible.

A checksum mechanism can be provided for combining the identification data of the tags to reduce the tracing of specific identifications.

The registration of the set of tags may be for a group of individuals each of whom is authorised to the same level for access to common resources. Each individual will possess a sub-set of the registered tags and a selection of any individual's sub-set will allow access to the common resource.

In one embodiment of the system, the reference 208 in the record 206 can be automatically generated from the tag identification data 212. Once the tags 204 have been scanned at registration, one of the tags 204 is automatically selected by the system to be the reference. This could be done by the system ordering the identification data 212 by the content in numerical order and selecting a predetermined number tag, for example the fifth tag in the ordered list. This tag then becomes the reference tag.

The tag identification data can indicate a type of object 202 in which the tag 204 is hosted. This means that the reference tag could be chosen from only the tags 204 hosted in particular types of objects. The type of object could be designated by value, age, product type, etc. This avoids a tag being selected as the reference tag when it is housed in a consumable object which may have been discarded by the user.

A user 200 does not then need to provide the reference himself to the record. A scanning of the user 200 will locate the tags 204 in his possession. The data processing system will order the tag identifications 212 and select the predetermined tag of a group of tags hosted in particular types of objects. The data processing system can then search through the records 206 of users using the selected tag identification as the reference to locate the correct record 206 for the user 200.

At the time of registration of tag identifications, an interface may be provided for enabling the scanned information obtained by a reader to be reviewed, altered and confirmed by the user. When a user is scanned he may have tags in his possession which he will not keep with him during the entire time period of the registration. Tags may be included in low cost items such as drink cans which will only be in the user's possession temporarily. Tag identifications for such items will need to be deleted from the registered set. Default mechanisms can be provided in the interface for accepting or rejecting tag identifications for predefined types of objects.

At a point of registration, the user can sign or authenticate the set using some additional authentication mechanism such as a user id/password, private key, or trusted set of tags.

Figure 3:
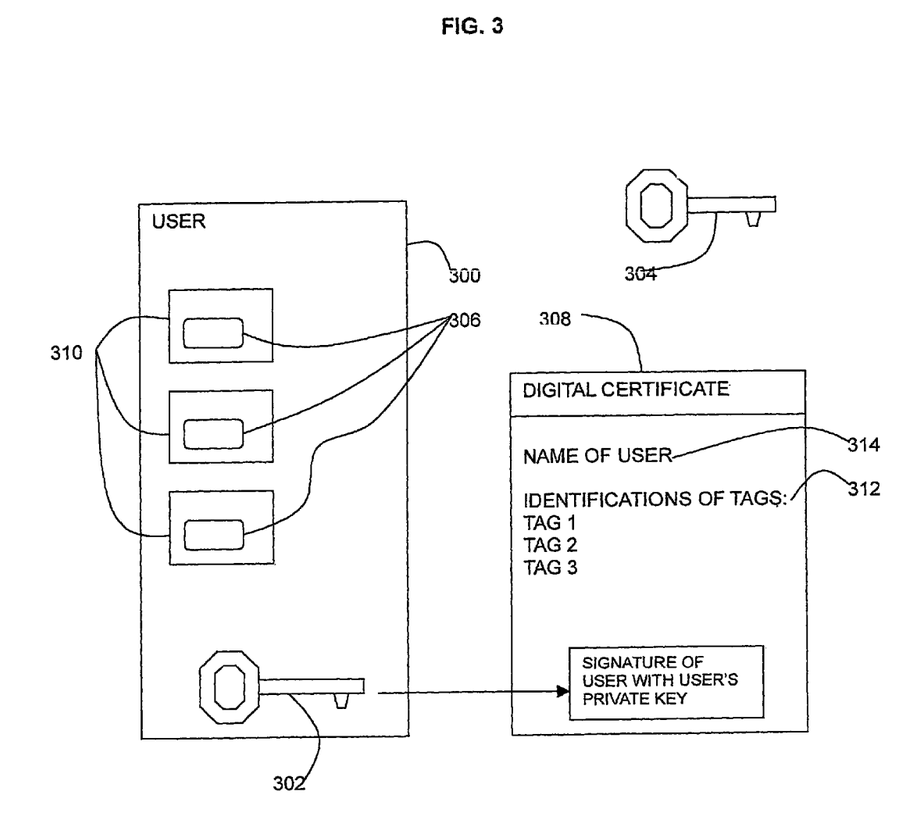
FIG. 3 is a schematic diagram of an identification system in accordance with a second embodiment of the present invention.

Referring to FIG. 3, an embodiment is shown in which a user certifies the tag identification data providing an additional level of security to the system.

A user 300 has a private key 302 of an asymmetric private/public key pair. The public key 304 corresponding to the private key 302 is provided by the user 300 or published by a third party to a party operating in the identification system, as required. The public key 304 may be certified by an official trusted authority to form a certificate.

Public key cryptography uses an asymmetric algorithm in which the encryption and decryption keys are different and for which it is infeasible to compute one key knowing only the other. Users receive (or, with suitable hardware or software, can generate for themselves) a pair of keys—that is, two large numbers. The user keeps one of these keys private and never discloses it. The other key can be safely made public, just like a phone number or similar personal data. Because of the nature of the algorithm and the way the keys are generated, information encrypted with the private key can only be decrypted with the public key and vice versa.

The user 300 can encrypt a message with his private key 302. This cannot provide confidentiality, because anyone who knows the public key 304 can decrypt it. But the fact that they can decrypt it means the message must have come from the user—who alone has the private key 302. This provides integrity and authentication and can also be used as a basis for non-repudiation—the digital equivalent of a signature.

The user 300 has a set of tags 306 which are hosted by a variety of objects 310 in the user's possession. At a registration point in time, the user 300 registers his identity with the set of tags 306. This can be done by all the tags 306 being scanned by a reader as shown in FIGS. 1A and 1B in order for the identification data 312 of the tags 306 to be electronically recorded in a database. Some of the scanned tags 306 can be deselected at registration, if required.

A digital certificate 308 is then created including the name 314 of the user 300 and the list of the identification data 312 of the tags 306 associated with the user 300. The digital certificate 308 is signed by the user 300 with the user's private key 302.

The digital certificate 308 is then published in a public place or made available for access by another system. The digital certificate 308 can be accessed via a computer network such as the Internet by a party wishing to authenticate a user 300. The party is provided with the public key 304 of the user in order to enable the party to be sure that the digital certificate 308 is that of the user 300.

The information in the digital certificate 308 is in plaintext and available to be read by all parties to find out the tag identification data 312. As a further level of security, if required, the information in the digital certificate 308, or any part of it, can be encrypted so that only specific users can access the information.

For example, the data in the certificate 308 can be encrypted with the user's private key 302 and the data will only be available to parties who have the public key 304 of the user 300. The number of people who have access to the public key 304 can be controlled by the user 300 or by the operator of the identification system. This provides an added level of security to both the user 300 and the party obtaining authentication of the user 300.

The identification system may be used to enable, for example, authorisation of payment by a user using the tag identification as authentication.

A credit card company may operate a database of identification data relating to account holders. Each account holder is registered with the credit card company by recording a set of tag identifications for an account. The registration procedure will require authentication by means of a mechanism such as public key infrastructure, a pass-code, or other means.

The credit card company will hold a certificate containing the tag identification data, account details and credit limit for the account holder. The registration is done to the credit card company source only and so is private. The registered data can change regularly, for example daily, by sending the updated tag identification data to the credit card company every morning. This increases the security of the system and means that the registered set of tags are hosted in items in the possession of the user that day.

An account holder wishing to make a payment is scanned for a sub-set of the registered tags and authorisation for payment is sought by the trader from the credit card company. The credit card company will identify the account from the sub-set of tags and will know from the certificate how much the account holder is authorised to spend. If this amount is within the credit limit, payment is authorised. This process can be carried out automatically in a data environment with a tag reader provided at a place of trade.

The record of registered tags can have an expiry time or can be valid until superseded by the subsequent registration of a new or amended set of tag identifications. In the case of a payment mechanism, the expiry time should be short to increase the security.

Example 1

A user wishes to buy a ticket to a concert. The user has been registered with a total set of tags including a tag in his mobile phone. The user wishes to use his mobile phone as the ticket.

The user contacts the ticket office and buys the ticket. He gives his public registration reference to the ticket office. The ticket office accesses via the Internet the registration of the user from the reference. The registration provides the user's tag identification details.

The ticket office then enters the tag identification for the mobile phone in its database and the mobile phone will act as the ticket.

The user arrives at the concert with his mobile phone. He is scanned as he enters the concert. The scan identifies the tag of the mobile phone as being a ticket on the ticket office database and allows the user automatic entry into the concert.

As an alternative, the user may inform the ticket office directly of the tag identification he wishes to use as the ticket. This could be achieved by the user's mobile phone being scanned by the ticket office at the time of purchase, if the purchase was being made in person.

In this way the tag in an object is used as a ticket as a record showing the holder is entitled to certain rights.

Example 2

Access to a computer by a user can be controlled using a sub-set of tags. The computer has a reader for obtaining tag identification data. The user registers his total set of tags with the computer.

The computer rests in a secure mode, for example, with a locked screen. When the user is in a predefined vicinity of the computer the computer will identify the tags in the possession of the user. If the tags form a sub-set of the total set of tags registered for that user, the computer will allow access to the user and will de-activate the secure mode.

Similarly, when the user walks away from the computer, the reader in the computer will not be able to sense the tags and will again enter the secure mode.

The computer can be programmed to respond to other changes in the environment in the predefined vicinity of the computer. For example, if someone approaches the computer without security clearance, the screen will screen save.

In this way, given the user's tag profile, the system can provide access to services without any formal interaction with the computer.

Example 3

Payment for goods at a checkout can be carried out automatically using the tags in the possession of a customer.

As the customer moves to the checkout area the tags in the goods being purchased are scanned by a reader. The sub-set of tags in the customers possession of the registered tag set are also scanned.

The customer provides a reference to his public certificate and the authentication is performed. The reference may be a postcode or loyalty card, for example.

The reference may alternatively be one of the registered tags hosted in a predefined type of object in the customer's possession. The data processing system of the shop sorts the scanned tag identification data into numerical order and selects, for example, the fifth tag of a group of tags hosted in objects with a value over a certain amount or hosted in clothing objects. This is the reference tag and its identification data is used to search for the customer's public certificate on a credit card company system connected to the shop system via a network.

A credit card payment transaction is initiated following confirmation from the customer that he wishes to purchase all the scanned goods. The confirmation can be by signature, press of a button or verbal agreement.

Example 4

In this example, a car is the resource to which access is required. When a user enters a car, a reader scans the user for tag identifications. For a car, the registered set of tags may be held in a certificate which persists for a longer period. The sub-set of tags is compared to the certificate with the registered set of tags. This can be done automatically by a data system in the car via local wireless technology.

A car can also be the registration point for a user. Each morning a user can enter his car with his car key. The car key provides the additional authentication mechanism. Alternatively, the additional authentication mechanism may be provided by a specific predefined tag (for example, in a wallet) or group of tags.

The car identifies the user by the additional authentication mechanism and scans the user using a built in reader. The reader identifies all the tags in the possession of the user on that occasion.

An interface of the reader displays to the user the tag identifications located and provides an opportunity for the user to amend the set to be registered. The interface may have defaults for accepting or rejecting tags in certain items. For example, all tags in clothing may be accepted and all tags in temporary items such as consumables, for example confectionery packets, may be rejected.

Once the user has accepted the set of tags, the car data system can register the set and communicate the registered set to other destinations, for example to the database of the user's workplace.

On entering the workplace, the user is scanned by a reader and the tag identifications are checked against the registered set held in the database. As this database has already been updated by the car registration system, the user is permitted access to the workplace automatically.

The above examples show the wide range of applications of the described identification system. The strength of the system lies in the unpredictable nature of the tag identifications which will be used at any time. As the tags are low cost items, their use in objects can be widespread providing a high number of tags being recorded resulting in lots of permutations of the set.

Improvements and modifications can be made to the foregoing without departing from the scope of the present invention.

The invention claimed is:

1. An identification method, comprising:
a radio frequency identification (RFID) reader scanning a user to read N Radio Frequency Identification (RFID) tags respectively embedded in N objects being carried by the user, each tag of the N tags comprising a tag identifier of said each tag, said N being at least 2;
comparing the N tags read by the RFID reader with M tags in a registered record of data, said registered record comprising a reference to the user, each tag of the M tags comprising a tag identifier, said M exceeding N; and
permitting access by the user to a resource if said comparing has determined that the tag identifiers in the M tags comprise the tag identifiers in the N tags read by the RFID reader, wherein prior to said scanning the method further comprises randomly selecting the N tags from the M tags.

2. The method of claim 1, wherein after said scanning the method further comprises sorting the tag identifiers in the N tags read by the RFID reader.

3. The method of claim 1, wherein a tag identifier in a first tag of the N tags includes an indication of a type of the object in which the first tag is embedded.

4. The method of claim 1, wherein the M tags in the registered record have an expiration time.

5. An identification method, comprising:
a radio frequency identification (RFID) reader scanning a user to read N Radio Frequency Identification (RFID) tags respectively embedded in N objects being carried by the user, each tag of the N tags comprising a tag identifier of said each tag, said N being at least 2;
comparing the N tags read by the RFID reader with M tags in a registered record of data, said registered record comprising a reference to the user, each tag of the M tags comprising a tag identifier, said M being at least N; and
permitting access by the user to a resource if said comparing has determined that the tag identifiers in the M tags comprise the tag identifiers in the N tags read by the RFID reader, wherein the method further comprises providing a checksum mechanism for combining identification information in the N tag identifiers.

6. The method of claim 5, wherein M=N.

7. The method of claim 5, wherein M exceeds N.

8. The method of claim 5, wherein a tag identifier in a first tag of the N tags includes an indication of a type of the object in which the first tag is embedded.

9. The method of claim 5, wherein the M tags in the registered record have an expiration time.

10. An identification method, comprising:
a radio frequency identification (RFID) reader scanning a user to read N Radio Frequency Identification (RFID) tags respectively embedded in N objects being carried by the user, each tag of the N tags comprising a tag identifier of said each tag, said N being at least 2;
comparing the N tags read by the RFID reader with M tags in a registered record of data, said registered record comprising a reference to the user, each tag of the M tags comprising a tag identifier, said M being at least N; and
permitting access by the user to a resource if said comparing has determined that the tag identifiers in the M tags comprise the tag identifiers in the N tags read by the RFID reader, wherein prior to said scanning the method further comprises generating a digital certificate having data therein, and wherein the data in the digital certificate comprises a name of the user and the identifiers in the M tags.

11. The method of claim 10, wherein prior to said scanning the method further comprises authenticating the user during a registration process in which the registered record is generated.

12. An identification system, comprising:
a computer; and
a radio frequency identification (RFID) reader coupled to the computer;
said RFID reader configured to scan a user to read N RFID tags respectively embedded in N objects being carried by the user;
said tag of the N tags comprising a tag identifier of said each tag;
said N being at least 2;
said computer configured to perform a comparison of the N tags read by the RFID reader with M tags in a registered record of data;
said registered record comprising a reference to the user;
each tag of the M tags comprising a tag identifier;
said M exceeding N;
said computer configured to permit access by the user to a resource if said comparison has determined that the tag identifiers in the M tags comprise the tag identifiers in the N tags;
said computer configured to randomly select the N tags from the M tags prior to said scan of the user.

13. The system of claim 12, said computer configured to sort the tag identifiers in the N tags after said scan of the user.

14. The system of claim 12, wherein a tag identifier in a first tag of the N tags includes an indication of a type of the object in which the first tag is embedded.

15. The system of claim 12, wherein the M tags in the registered record have an expiration time.

16. An identification system, comprising:
   a computer; and
   a radio frequency identification (RFID) reader coupled to the computer;
      said RFID reader configured to scan a user to read N RFID tags respectively embedded in N objects being carried by the user;
      said tag of the N tags comprising a tag identifier of said each tag;
      said N being at least 2;
      said computer configured to perform a comparison of the N tags read by the RFID reader with M tags in a registered record of data;
      said registered record comprising a reference to the user;
      each tag of the M tags comprising a tag identifier;
      said M being at least N;
      said computer configured to permit access by the user to a resource if said comparison has determined that the tag identifiers in the M tags comprise the tag identifiers in the N tags;
   said computer configured to provide a checksum mechanism for combining identification information in the N tag identifiers.

17. The system of claim 16, wherein M=N.

18. The system of claim 16, wherein M exceeds N.

19. An identification system, comprising:
   a computer; and
   a radio frequency identification (RFID) reader coupled to the computer;
      said RFID reader configured to scan a user to read N RFID tags respectively embedded in N objects being carried by the user;
      said tag of the N tags comprising a tag identifier of said each tag;
      said N being at least 2;
      said computer configured to perform a comparison of the N tags read by the RFID reader with M tags in a registered record of data;
      said registered record comprising a reference to the user;
      each tag of the M tags comprising a tag identifier;
      said M being at least N;
      said computer configured to permit access by the user to a resource if said comparison has determined that the tag identifiers in the M tags comprise the tag identifiers in the N tags;
   said computer configured to generate a digital certificate having data therein prior to said scan of the user, wherein the data in the digital certificate comprises a name of the user and the identifiers in the M tags.

20. The system of claim 19, said computer configured to authenticate the user during a registration process in which the registered record is generated.

* * * * *